United States Patent [19]

Burch et al.

[11] Patent Number: 5,399,382
[45] Date of Patent: Mar. 21, 1995

[54] ELECTROLESS PLATED ARAMID SURFACES

[75] Inventors: Robert R. Burch, Exton, Pa.; Richard Gould, Wilmington, Del.; Kiu-Seung Lee, Richmond, Va.; Brian R. Phillips, Wilmington, Del.

[73] Assignee: E. I. Du Pont de Nemours and Company, Wilmington, Del.

[21] Appl. No.: 61,063

[22] Filed: May 14, 1993

Related U.S. Application Data

[63] Continuation of Ser. No. 674,402, Mar. 25, 1991, abandoned.

[51] Int. Cl.$^6$ .............................. B05D 1/00
[52] U.S. Cl. .................... 427/306; 427/304; 427/305; 427/443.1
[58] Field of Search ............... 427/304, 305, 306, 437, 427/443.1

[56] References Cited

U.S. PATENT DOCUMENTS

| | | | |
|---|---|---|---|
| 3,094,511 | 6/1963 | Hill | 528/183 |
| 3,354,127 | 11/1967 | Hill | 528/183 |
| 3,673,143 | 6/1972 | Bair | 524/104 |
| 3,767,756 | 10/1973 | Blades | 264/184 |
| 3,819,587 | 6/1974 | Kwoleck | 264/210.8 |
| 3,869,429 | 3/1975 | Blades | 264/203 |
| 4,172,938 | 10/1979 | Mera | 528/336 |
| 4,244,789 | 1/1981 | Coll-Palagos | 427/306 |
| 4,308,374 | 12/1981 | Vollbracht | 528/336 |
| 4,312,917 | 1/1982 | Hawley | 264/255 |
| 4,614,684 | 9/1986 | Ebneth et al. | 428/252 |
| 4,634,805 | 1/1987 | Orban | 174/126.4 |
| 4,698,414 | 10/1987 | Bair | 528/339 |
| 4,808,481 | 2/1989 | Luxon | 428/408 |
| 4,835,015 | 5/1989 | Kistrup | 427/443.1 |
| 5,024,858 | 6/1991 | Burch | 427/306 |
| 5,035,924 | 7/1991 | Massa | 427/305 |
| 5,073,440 | 12/1991 | Lee | 428/373 |
| 5,135,687 | 8/1992 | Lee | 264/28 |

FOREIGN PATENT DOCUMENTS

| | | | |
|---|---|---|---|
| 163805 | 12/1985 | European Pat. Off. | 427/304 |
| 0401740 | 12/1990 | European Pat. Off. | |
| 2820502 | 11/1979 | Germany | |
| WO9000634 | 1/1990 | WIPO | |
| WO9216589 | 10/1992 | WIPO | 427/304 |

*Primary Examiner*—Shrive Beck
*Assistant Examiner*—Vi Duong Dang

[57] ABSTRACT

Conductive fibers of a combination of aramid and polyvinyl pyrrolidone (PVP) are disclosed having a strongly bonded metal coating applied by electroless plating. PVP increases adhesion of the fiber surface to the electroless plating. The preferred aramid is poly(p-phenylene terephthalamide).

8 Claims, No Drawings

ELECTROLESS PLATED ARAMID SURFACES

This is a continuation of application Ser. No. 07/674,402, filed Mar. 25, 1991, now abandoned.

BACKGROUND OF THE INVENTION

1. Field of the Invention

This invention relates to electroless metal plating of aramid surfaces wherein the metal is strongly adhered to the aramid substrate and provides a highly conductive surface. The aramid includes a small amount of polyvinyl pyrrolidone as an additive polymer which improves the plating quality, the adhesion, and, consequently, the conductivity of the metal coating.

2. Description of the Prior Art

Electroless plating is the deposition of a metal film by interaction of a metal salt and a chemical reducing agent. Electroless plating, in a general way, is well known. One of the difficulties in achieving successful electroless plating has resided in obtaining .good adhesion between the plating substrate and the plated metal. While mere encapsulation may suffice for some applications and some articles, good adhesion of the plated metal is essential for fibers because the plated metal coating must withstand the forces of further processing.

U.S. Pat. No. 4,614,684 issued Sep. 30, 1986 on the application of Ebneth et al. discloses that a fabric of poly(p-phenylene terephthalamide) (PPD-T) fibers can be nickel plated by a rather complicated process which includes activating the fabric in butadiene-palladium chloride and immersing the fabric in a nickel chloride bath with citric acid and dimethylamine borane.

German Published Application 2,820,502 published Nov. 15, 1979 in the name of Ebneth discloses electroless deposition of nickel on fabrics of PPD-T and poly(m-phenylene isophthalamide) (M-PDI) by pretreatment of the fabric with a colloidal solution of palladium in aqueous HCl.

European Patent Publication number 401,740, published Dec. 12, 1990 in the name of Lee, discloses fibers which include PPD-T and an additive amount of polyvinyl pyrrolidone (PVP) and a process for making such fibers. It is the fibers of that application which are used in practice of the present invention.

International Patent Publication WO 90/00634, published Jan. 25, 1990, discloses a process for plating a polymer wherein metal cations are electrostatically bonded to the polymer in a non-aqueous system and are, then, reduced to metal.

SUMMARY OF THE INVENTION

The present invention provides a process for plating an aramid surface with a strongly adherent metal coating wherein the material which forms the aramid surface is a substantially homogeneous composition including from 70 to 98, weight percent, aramid and from 2 to 30, weight percent polyvinylpyrrolidone (PVP). The process of the invention comprises the steps of: a) contacting the surface of an aramid structure with an aqueous solution of activating metal cations to, thereby, adhere activating metal cations to the surface of the aramid structure; b) rinsing the surface of the aramid structure to remove nonadherent activating metal cations; c) immersing the rinsed aramid surface in an aqueous solution of metal cations to be plated; and d) adding a reducing agent to the aqueous solution of metal cations; whereby metal cations are reduced to metal and are plated on the aramid surface.

The present invention includes the plated aramid product of this process. The product is an article comprising the above-mentioned substantially homogeneous combination of aramid and PVP having a metal coating strongly adhered to a surface of the article.

Detailed Description of the Invention

There has long been a need for conductive aramid fibers which have durable metallic coatings and that need is especially acute for fibers which exhibit high strength and modulus.

Fibers of aramids, particularly para-aramids, have been difficult to plate with a strongly adherent metal coating. Aramid fiber surface treatments and pretreatments have, generally, not been effective.

This invention provides a process for electrolessly plating fibers of aramids in a way that yields a plated fiber product of maintained strength and modulus and a metal coating which is highly conductive and strongly adherent.

The fibers used in this invention include an additive amount of polyvinyl pyrrolidone (PVP) distributed throughout the fiber structure. It is believed that the presence of the PVP assists, in some way, to provide sites for adherence of metal in the electroless plating process of the fibers. The reason for improvement of plating adhesion is not fully understood.

By "aramid" is meant a polyamide wherein at least 85% of the amide (—CO—NH—) linkages are attached directly to two aromatic rings. Suitable aramid fibers are described in Man-Made Fibers—Science and Technology, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511.

Additives can be used with the aramid and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

Para-aramids are the primary polymers in fibers of this invention and poly (p-phenylene terephthalamide)(PPD-T) is the preferred para-aramid. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride; provided, only that the other aromatic diamines and aromatic diacid chlorides be present in amounts which permit preparation of anisotropic spin dopes. Preparation of PPD-T is described in U.S. Pat. Nos. 3,869,429; 4,308,374; and 4,698,414.

PVP is the additive polymer in fibers of this invention. By PVP is meant the polymer which results from linear polymerization of monomer units of N-vinyl-2-pyrrolidone with or without the inclusion of small amounts of comonomers which may be present in concentrations below those which do not interfere with interaction of the PVP with the PPD-T or with metal cations.

It has been determined that PVP of nearly any molecular weight can be used in practice of this invention. PVP of molecular weights ranging from as little as about 5000 to as much as about 500,000 can be used, and all will result in the benefits of this invention to some extent. PVP with a molecular weight of about 10,000 to about 40,000 is preferred, and 10,000 to 24,000 is most preferred. PVP with a molecular weight below about 5,000 does not appear to make a strong complex with the para-aramid PVP combination and is extracted easily from the fiber. PVP with a molecular weight above about 100,000, causes an increase in metal demand for a minimum conductivity level. The reason for that increased metal demand is not understood.

Fibers used in the present invention can be spun using the process of European Patent Publication No. 401,740, published Dec. 12, 1990 wherein an agitated anisotropic mixture of acid solvent, para-aramid, and PVP is heated and extruded through a spinneret, into and through a non-coagulating layer, and into and through an aqueous coagulating bath. Elements of that process, using PPD-T, alone, are taught in U.S. Pat. No. 3,767,756, issued Oct. 23, 1973. Fibers used in this invention can be used as-spun or heat treated.

The electrical qualities of the plated fiber of this invention are controlled or altered by the amount of PVP which is included in the fibers. As stated, PVP can be present in amounts from 2 to 30 weight percent, based on weight of the PPD-T. The lower limit is a limit of practicality because, although the benefits of the invention will be present at any concentration of PVP, the benefits are difficult to measure at concentrations of less than about 2 weight percent.

The upper limit represents the concentration at which some qualities of the fiber begin to deteriorate due to the presence of excess PVP. It should be recognized that PVP is not known to be an outstanding or even impressive fiber forming material; and that, even though its presence in fibers in combination with PPD-T yields fibers of excellent and entirely unexpected improvements, there is a concentration for the PVP above which some qualities of the fibers are not acceptable. It is believed that above about 30 weight percent of PVP, based on PPD-T, the PVP is irreversibly leached from the fiber into the coagulation bath during manufacture.

Fibers of para-aramid/PVP combination can be plated by the process of this invention in accordance with the following general process.

An aqueous activation bath is prepared using appropriate activating cations, among which stannous preferred. Para-aramid fibers to be plated are immersed in the bath and agitated to promote the activation. The fibers are removed from the activation bath and rinsed until there is substantially no activating cation in the rinse water.

The rinsed and activated fibers are placed in another aqueous bath which will become the plating bath and which may include a surfactant to assist in complete wetting. The surfactant is preferred but not necessary and, if used, should be nonionic and should be used at a concentration of 1 to 5 grams per liter of bath.

A metal complex solution is added to the fibers to form the plating bath. The metal complex solution is made by dissolving the appropriate amount of metal salt, for example silver nitrate, in water followed by addition of ammonia until the solution is a light straw color and has a pH of 8-9.5, preferably, 9. The appropriate amount of metal salt is that amount which will provide the desired weight of reduced metal as a function of the fiber material to be plated. For example, if it is desired to make a "40 percent bath", there must be enough silver nitrate to provide reduced silver in a weight of 40% of the weight of the fiber to be plated in the bath.

Baths having a wide range of metal concentrations can be used in practice of this invention. As will be seen in the Examples, the preferred plating baths are from about 30 to 45 percent silver. In tests by the inventors herein, baths of 35 to 40 percent silver are most effective and most preferred.

The total volume of the plating bath should be such that the concentration of the silver nitrate is less than about 10 grams per liter. It has been found that metal complex solutions which are too concentrated in the metal cations may yield free metal granules rather than a strongly adherent metal coating.

The plating bath, with immersed fibers, is moderately agitated for 10 to 20 minutes to assure near equilibrium of the system; and then formaldehyde is added to the bath as a reducing agent. The formaldehyde is generally added as a 37, weight percent, aqueous solution; and is added in an amount to constitute a mole ratio with the silver of 1.1/1 to 2/1, or more. The formaldehyde can be added all at once or in increments over a period of time. For example, it has been found to be useful to add the formaldehyde in 10% increments over the course of an hour, or so. The agitation is preferably continued until an analysis of the plating bath reveals silver residuum of less than about 5 parts per million. The plated material can then be rinsed and dried.

All of the above steps can be conducted with the various baths at temperatures of 10° to 60° C., and preferably 20°-40° C.

Instead of the silver complex solutions, other solutions can be used to plate other metals. Nickel, copper, gold, and the like can be plated by these processes. If desired or required, a bath having a low concentration (2 to 5%) of silver can be used for additional surface activation and then complex solutions of other plating metals can be used. A nickel bath can include 0.2 molar nickel chloride and 0.2 molar sodium hypophosphite adjusted to a pH of 9-9.5 with ammonia. A copper bath can include 30 grams per liter copper sulfate, 100 grams per liter Rochelle salt (potassium sodium tartrate), and 50 grams per liter 37% formaldehyde solution adjusted to a pH of 11-12 with sodium hydroxide.

Test Methods Resistivity

Resistivity of plated fibers can be determined as ohms per inch of fiber or, in the case of woven or knitted fibers, as ohms per square. Absolute values for either determination are a matter of fiber size and fabric weave in addition to amount of plated metal and continuity of the plating.

To determine ohms per inch on a fiber, the dry fiber is placed on a flat surface and the probes of an ohmmeter are pressed firmly on the fiber at a one-inch spacing.

To determine ohms per square on a woven fabric, ohmmeter probes which are one inch long and are pressed firmly on the fabric parallel and at a one inch spacing.

In each case, the resistivity is the ohms indicated by the ohmmeter reading.

Metal Adhesion

Adhesion of the plated metal is measured on fabrics of plated fibers by rubbing the plated surface to determine the ease by which the metal is removed from the substrate. Degree of adhesion can be measured in a subjective way by rubbing a plated article by hand to estimate the degree of metal rubbed off as compared with a control material.

Objective means for measuring adhesion are not well developed. The inventors have elected to use a so-called "Crocking Test" developed and certified by the American Association of Textile Chemists and Colorists (AATCC) for determination of color fastness in dyes. In the Crocking Test, identified as AATCC Test. Method 116-1983, a Rotary Vertical Crockmeter is used to perform a controlled, rubbing on a fabric to be tested. Results of the Crocking Test are presented on a scale of 1 to 5 with 5 representing no transfer and 1 representing transfer of a very high degree.

Description of the Preferred Embodiments

In the Examples which follow, all parts are by weight unless specifically stated to be otherwise.

Example 1

Ten foot skeins of several yarns, as identified below, were each soaked for 20 minutes in a solution of 45.6 grams of stannous chloride in 400 milliliters of water having the pH adjusted to about 1.5 with HCl. The skeins were each rinsed with water and then placed in a solution of 6.8 grams of silver nitrate, 3 milliliters of nitric acid solution, and 5.5 grams of 37% formaldehyde, all in 400 milliliters of water, to which ammonium hydroxide was added to reach a pH of about 9.

Silver spontaneously plated onto each yarn and the yarns were rinsed and inspected. The yarns in the test were all 1000 filament—1500 denier yarns. One of the yarns was made from filaments 85% PPD-T and 15% PVP (40,000) and one of the yarns was made from filaments 75% PPD-T and 25% PVP. A control yarn was 100% PPD-T.

While all of the yarns exhibited some degree of electrical conductivity, the plating was poorly adhered to the control (it was easily rubbed off) and the plating was strongly adhered to the fibers containing PVP (it was difficult to rub off).

The process which was used to electrolessly plate aramid surfaces for the following Examples, in accordance with this invention, is as follows:

Yarn of the kind described in the particular example was knitted into knit/deknit tubing. 500 grams of that tubing were soaked for about six minutes in an aqueous 0.1 molar solution of stannous chloride with the pH adjusted to about 1.5 using HCl. The tubing was then rinsed in deionized water to an absence of stannous ion in the rinse water.

The tubing was placed, under moderate agitation, in a vessel with 80 liters of water and about 2 grams per liter of a nonionic surfactant. A silver complex solution was added to the vessel and the agitation was continued for about 10 to 15 minutes before adding 37 percent formaldehyde solution in appropriate amount. After addition of the formaldehyde, the agitation was continued until the solution contained less then 1 ppm silver. Silver spontaneously plated on the fibers. The tubing was rinsed free of residual bath chemicals and dried.

The silver complex solution was made up to a concentration as specified in the individual examples. The amounts of silver nitrate and formaldehyde were adjusted as shown in the table, below, for 500 grams of fiber and the desired percentage of plated metal; and, of course, the amount of pH adjusting ammonia was varied with variations in the amount of silver nitrate.

TABLE 1

| Desired percentage of Plated metal | Silver Nitrate (grams) | 37% formaldehyde (ml) |
|---|---|---|
| 20 | 250 | 190 |
| 30 | 375 | 285 |
| 40 | 500 | 375 |
| 50 | 625 | 470 |

Different amounts of materials for different percentages of plated metal or for different amounts of fiber can be found by simple interpolation from the Table.

To make a complex solution of 40 percent silver for 500 grams of fiber, 500 grams of silver nitrate were dissolved in about 2 liters of water and about 375 milliliters of 38 weight percent ammonium hydroxide were added to adjust the pH to about 9. Enough formaldehyde was used to provide a molar excess based on the silver. The mole ratio of formaldehyde to silver can range from 1.1 to 2 or higher.

Example 2

Yarn of 85% poly(p-phenylene terephthalamide) (PPD-T) and 15% PVP (40,000 MW) having 1000 filaments and 1500 denier, and in the form of a knit/deknit tubing, was plated, by the process of this invention, in a 40% silver bath, as described above. The fibers were spun as taught in Example 1 of previously mentioned European Patent Publication No. 401,740.

As comparisons, yarn of 100% PPD-T having 1000 filaments and 1500 denier and in the form of a knit/deknit tubing was plated using the same procedure as described above; and, also, was plated using a process from the prior art. All comparison plating tests used a 40% silver bath.

PPD-T yarn was, also, plated in accordance with the procedure set out in German Patent No. 1,197,720 naming Ebneth as the inventor. The PPD-T surface was activated by immersion for about 3 minutes in a bath of colloidal palladium, rinsed, soaked for about 2 minutes in a 5% solution of sodium hydroxide, and rinsed. The fibers were then plated in a 40% silver bath using the same procedure as described above. The bath of colloidal palladium was made by pouring together equal volumes of a 0.2 molar solution of stannous chloride and a 0.2 molar solution of palladium chloride and, then, adjusting the pH to less than 1 using HCl.

The fabric of the plated yarns were tested for resistivity and plating adhesion. The plating adhesion test was the "Crocking Test" as described above

TABLE 2

| Material | Resistivity Ohms/Square) | Adhesion (Rating) |
| --- | --- | --- |
| This Invention | 0.2 | 3.5 |
| PPD-T Only | 2.4 | 1 |
| [Ebneth] | 0.8 | 1 |

Example 3

As a further test of the improved adhesion between fiber substrates and plated metal, yarn of this invention, as plated in Example 2 above, and yarn of 100% PPD-T were plated by the procedure as described above and the plated yarns were conducted through a device wherein the fibers are drawn through an extrusion die to be encased by a thermoplastic matrix material and then the encased fibers were chopped to provide pellets for later molding processes. An example of such a device is described in U.S. Pat. No. 4,312,917 and the process is commonly referred to as "poltrusion".

The thermoplastic matrix material was nylon 6,6; the processing temperature range was 265°-295° C., and the machine settings were such that the encased product would be about 35 weight percent fiber. Processing of the yarn plated by this process went smoothly and the encased product was cut into pellets about 0.25 inch long. Processing of the PPD-T only yarn was difficult because the plated metal kept flaking off of the fibers and interfering with extrusion of the matrix resin. Some encased product was, however, collected and tested, as a comparison, with pellets of the encased fibers of this invention.

To test the degree of plated metal loss from the fibers due to the extrusion process, an amount of each of the pellet products was dissolved in a solvent of equal volume parts of methylene chloride and trifluoroacetic anhydride. The fibers in each sample were separated from the solvent, were rinsed with acetone, and were pressed into a mat. The resistivity of the fibers of this invention was determined to be 10 ohms/square and the resistivity for the PPD-T only fibers was determined to be greater than 500,000 ohms/square; thus, indicating that the adhesion of metal on the fibers of this invention is much improved over that of the control materials.

Example 4

A series of fibers made from PPD-T with varying amounts of PVP (40,000 MW) was plated by the process of this invention, as described above, and tested for resistivity. The plating bath for this example included 25% silver.

The plated fibers were tested for resistivity. The results are shown in Table 3.

The fibers were spun to have PVP concentrations as noted in Table 3. As a control comparison, fibers made from PPD-T only, with no PVP, were, also, plated under the same conditions.

TABLE 3

| PVP (Weight %) | Resistivity (ohms/inch) |
| --- | --- |
| 0 (Control) | Off Scale* |
| 9 | 1,800,000 |
| 12 | 45,000 |
| 15 | 1,400,000 |

*"Off Scale" is greater than 200,000,000.

This example provides indication that there is a range of PVP concentrations useful for obtaining the plated fibers of this invention. While it may appear that fibers made using 12% PVP yield remarkably lower resistance than do fibers made using higher and lower PVP concentrations, such results are believed to vary considerably with change in other parameters of the process. The benefits of this invention are realized over a broad range of PVP concentrations, from about 3 to 30 percent; and the preferred range of concentrations is about 9 to 15 percent.

As a subjective test of silver plating adhesion, the fibers of this example were rubbed by hand and the results were noted. The silver was difficult to rub off of the fibers which had PVP content and the silver rubbed off very easily from the Control fibers with no PVP content.

Example 5

In accordance with the procedure set out above, PPD-T fibers, including 15% PVP (40,000 MW), were plated with silver in baths having a series of varying silver concentrations.

The plated fibers were tested for resistivity. The results are shown in Table.4.

TABLE 4

| Silver in Bath (%) | Resistivity (ohms/square)* |
| --- | --- |
| 20 | Off Scale |
| 25 | 25.1 |
| 30 | 2.9 |
| 35 | 0.95 |
| 37 | 0.44 |
| 40 | 0.48 |
| 50 | 4.37 |
| 60 | Off Scale. |

*"Off Scale" is greater than 200,000,000.

Fibers of the highest conductivity were obtained using baths which contained silver in concentrations from 25 to about 55%. At bath concentrations of less than 20% and greater than 60%, the plating was ineffective to provide conductive coatings. Fibers of the highest conductivity had silver coatings which were most difficult to rub off, thus, indicating the greatest silver coating adhesion to the fiber substrate.

Example 6

In accordance with the procedure set out above, PPD-T fibers, including 15% of PVP of various molecular weights, were plated in baths of 50% silver concentration.

The plated fibers were tested for resistivity. The results are shown in Table 5.

TABLE 5

| PVP | Resistivity | |
| --- | --- | --- |
| (MW) | (ohms/in) | (ohms/square) |
| 40000 | 27 | 6.8 |
| 24000 | 5.9 | 1.6 |
| 10000 | 1.4 | 0.1 |

There is a wide range of acceptable molecular weights for the PVP used in practice of this invention. For reasons of solubility limits—that is, excessive solubility at very low molecular weights and excessive solution viscosity at very high molecular weights—the practical molecular weight range for PVP appears to be about 5,000 to 500,000. The preferred range is about 10,000 to 24,000.

The silver was very difficult to rub off of the plated fibers in this example.

We claim:

1. A process for plating an aramid surface with a metal coating consisting essentially of the steps of:
   a) contacting the surface of an aramid structure with an aqueous solution of activating metal cations to, thereby, adhere activating metal cations to the surface of the aramid structure;
   b) rinsing the surface of the aramid structure to remove nonadherent activating metal cations;
   c) immersing the rinsed aramid surface in an aqueous solution of metal cations to be plated and
   a reducing agent;
   whereby metal cations are reduced to metal and are plated on the aramid surface,
   wherein the improvement comprises,
   providing, as the material which forms the aramid surface, a composition including a substantially homogeneous, combination of from 70 to 98, weight percent, aramid and from 2 to 30, weight percent, polyvinyl-pyrrolidone (PVP) yielding a plated metal coating which is strongly adherent to the aramid surface.

2. The process of claim 1 wherein the activating metal cation is stannous.

3. The process of claim 1 wherein the aramid surface is a fiber.

4. The process of claim 1 wherein the metal cation to be plated is selected from the group consisting of silver, copper, and nickel.

5. The process of claim 1 wherein the reducing agent is formaldehyde and ammonium hydroxide is the pH adjusting material.

6. The process of claim 1 wherein the PVP has a molecular weight of 10,000 to 40,000.

7. The process of claim 1 wherein the aramid is a para-aramid.

8. The process of claim 7 wherein the para-aramid is poly (p-phenylene terephthalamide).